United States Patent
Alvarez et al.

(10) Patent No.: US 8,658,020 B2
(45) Date of Patent: Feb. 25, 2014

(54) PROCESS FOR UPGRADING KEROSENE TO GASOLINE BY RING CONTRACTION—RING OPENING—DEHYDROGENATION

(75) Inventors: Walter E. Alvarez, Bartlesville, OK (US); Edward L. Sughrue, II, Bartlesville, OK (US); Paul F. Meier, Bartlesville, OK (US); Tushar V. Choudhary, Bartlesville, OH (US)

(73) Assignee: Phillips 66 Company, Houston, TX (US)

( * ) Notice: Subject to any disclaimer, the term of this patent is extended or adjusted under 35 U.S.C. 154(b) by 1361 days.

(21) Appl. No.: 11/960,084

(22) Filed: Dec. 19, 2007

(65) Prior Publication Data

US 2009/0163747 A1 Jun. 25, 2009

(51) Int. Cl.
*C10G 69/08* (2006.01)
*C10G 35/06* (2006.01)

(52) U.S. Cl.
USPC ............... 208/57; 208/49; 208/134; 208/141; 208/144; 585/310

(58) Field of Classification Search
USPC ............... 208/49, 57, 134, 141, 144; 585/310
See application file for complete search history.

(56) References Cited

U.S. PATENT DOCUMENTS

| | | | |
|---|---|---|---|
| 3,631,117 A | 12/1971 | Kovach et al. | 260/666 |
| 3,631,215 A | 12/1971 | Clippinger et al. | 260/673 |
| 5,763,731 A | 6/1998 | McVicker et al. | 585/737 |
| 6,500,329 B2 | 12/2002 | Tsao et al. | 208/59 |
| 2002/0056663 A1 * | 5/2002 | Walsh et al. | 208/133 |
| 2005/0103682 A1 | 5/2005 | Yoon et al. | |

OTHER PUBLICATIONS

Albahri et al, "Octane Number and Aniline Point of Petroleum Fuels", Fuel Chemistry Division Preprints 2002, 47(2), pp. 710-711.*

* cited by examiner

*Primary Examiner* — Renee E Robinson
(74) *Attorney, Agent, or Firm* — Phillips 66 Company

(57) ABSTRACT

A process is disclosed for converting distillate to gasoline-range hydrocarbons using a two-stage catalyst system including a first catalyst containing a Group VIII metal and a zeolite, and a second catalyst containing a Group VIII metal, tin and an inorganic oxide support.

18 Claims, No Drawings

PROCESS FOR UPGRADING KEROSENE TO GASOLINE BY RING CONTRACTION—RING OPENING—DEHYDROGENATION

The invention relates to an improved process and catalyst system for converting kerosene or distillate (hereinafter referred to as "distillate") to gasoline. More particularly, the invention relates to a two-stage and two catalyst process and/or system for converting distillate to gasoline.

Under certain market conditions it can be desirable to convert distillate range hydrocarbons to gasoline range hydrocarbons. Thus, there are incentives to develop efficient catalysts and processes useful for the conversion of distillate to gasoline.

SUMMARY OF THE INVENTION

In accordance with an embodiment of this invention, a distillate-to-gasoline catalyst system is provided for the conversion of distillate to gasoline which includes:
a) a first catalyst comprising a Group VIII metal and a zeolite; and
b) a second catalyst comprising a Group VIII metal, tin and an inorganic metal oxide support.

In accordance with another embodiment of this invention, a process for converting distillate-to-gasoline is provided including the following steps:
i) contacting a distillate feedstream having an RON of less than about 45 and comprising a) $C_{10}$ and heavier hydrocarbons; b) at least about 20 wt. % 2-ring naphthenes; c) less than about 40 wt. % 1-ring naphthenes, and d) less than about 5 wt. % $C_6$-$C_9$ aromatics, wherein less than about 75 wt. % of the distillate feedstream boils at a temperature less than or equal to about 221° C.; with a first catalyst comprising a Group VIII metal and a zeolite to thereby produce an intermediate product comprising a) at least about 50 wt. % 1-ring naphthenes; and b) less than about 1 wt. % 1-ring aromatics; wherein at least about 90 wt. % of the intermediate product boils at a temperature less than or equal to about 221° C.; and
ii) contacting the intermediate product with a second catalyst comprising a Group VIII metal, tin and an inorganic metal oxide support to thereby produce a product stream having an RON of at least about 60 and comprising a) less than about 15 wt. % 2-ring naphthenes; and b) at least about 9 wt. % $C_6$-$C_9$ aromatics; wherein at least about 90 wt. % of the product stream boils at a temperature less than or equal to about 221° C.

DETAILED DESCRIPTION OF THE INVENTION

The distillate feedstream of the current invention can be any distillate-range hydrocarbon material. The distillate feedstream typically has an RON of less than about 45 and comprises, consists of, or consists essentially of: a) $C_{10}$ and heavier hydrocarbons; b) at least about 20 wt. %, more particularly at least about 25 wt. % 2-ring naphthenes; c) less than about 40 wt. %, more particularly less than about 35 wt. % 1-ring naphthenes, and d) less than about 5 wt. % $C_6$-$C_9$ aromatics, wherein less than about 75 wt. % of the distillate feedstream boils at a temperature less than or equal to about 221° C. The distillate feedstream can boil below about 288° C., and can also comprise a fraction boiling below about 249° C. The 1-ring naphthenes each have only one six-member ring, and can have a five member ring. The 2-ring naphthenes each have two six-member rings.

The distillate feedstream is converted to a gasoline-range product by processing in a distillate-to-gasoline catalyst system containing a first reaction zone and a second reaction zone.

The distillate feedstream is contacted, in the first reaction zone, with a first catalyst comprising, consisting of, or consisting essentially of a Group VIII metal and a zeolite, in the presence of hydrogen to produce an intermediate product.

In the first reaction zone, at least a portion of the aromatic compounds of the distillate feedstream are hydrogenated and at least a portion of the 2-ring naphthenes (which each have two six member rings) are converted, through ring contraction, to form compounds having one six member ring and one five member ring. At least a portion of the 2-ring naphthenes are converted, through ring opening, to alkyl 1-ring naphthenics by opening the five member rings. Also, at least a portion of the distillate feedstream is converted to lower boiling hydrocarbons.

The first reaction zone includes a temperature from about 232° C. to about 260° C., preferably from about 238° C. to about 257° C.; a pressure from about 250 psig to about 350 psig, preferably from about 275 psig to about 325 psig; and a WHSV from about 2 to about 9 hr.$^{-1}$, preferably from about 3 to about 5 hr.$^{-1}$.

The zeolite can be any zeolite suitable for converting the distillate feedstream and which has a $SiO_2/Al_2O_3$ molar ratio from 5 to 60. Preferably, the zeolite is a Y zeolite, and more preferably is a hydrogen exchanged Y zeolite. The Group VIII metal of the first catalyst preferably comprises platinum. Also, the first catalyst preferably contains from about 0.1 to about 5 weight percent Group VIII metal.

The Group VIII metal can be added to the zeolite by any method known for incorporating metals on a support. Preferably, the Group VIII metal is incorporated on or into the zeolite by incipient wetness impregnation, optionally followed by drying and calcining in the presence of oxygen. Prior to use in the catalyst system, the first catalyst is reduced in the presence of a reducing gas.

The intermediate product comprises at least about 50 wt. %, preferably at least about 55 wt. %, 1-ring naphthenes; and less than about 1 wt. %, preferably less than 0.5 wt. %, 1-ring aromatics; wherein at least about 90 wt. %, preferably at least about 95 wt. %, of the intermediate product boils at a temperature less than or equal to about 221° C.

The intermediate product is contacted, in the second reaction zone, with a second catalyst comprising, consisting of, or consisting essentially of a Group VIII metal, tin and an inorganic metal oxide support to thereby produce a product stream.

In the second reaction zone, at least a portion of the hydrocarbons in the intermediate product are converted to aromatics.

The second reaction zone includes a temperature in the range of from about 399° C. to about 452° C., preferably from about 413° C. to about 452° C.; a pressure in the range of from about 250 psig to about 350 psig, preferably from about 275 psig to about 325 psig; and a WHSV of from about 2 to about 6 hr.$^{-1}$, preferably from about 3 to about 5 hr.$^{-1}$.

The inorganic metal oxide support can be any such support capable of supporting a Group VIII metal and tin. Preferably, the inorganic metal oxide support is a silica. The Group VIII metal of the second catalyst preferably comprises platinum. Also, the second catalyst preferably contains from about 0.5 to about 5 weight percent Group VIII metal, and from about 0.5 to about 5 weight percent tin.

The Group VIII metal and the tin, can be added to the inorganic metal oxide support by any method known for incorporating metals on a support. Preferably, the Group VIII metal and the tin are separately incorporated on or into the inorganic oxide support by incipient wetness impregnation, optionally followed by drying and calcining in the presence of oxygen. Prior to use in the catalyst system, the second catalyst is reduced in the presence of a reducing gas.

The product stream produced has an RON of at least about 60; and comprises, consists of, or consists essentially of a) less than about 15 wt. % 2-ring naphthenes; and b) at least about 9 wt. % $C_6$-$C_9$ aromatics; wherein at least about 90 wt. %, preferably at least about 95 wt. %, of product stream boils at a temperature less than or equal to about 221° C.

The product stream preferably comprises at least about 80 wt. %, more preferably at least about 90 wt. %, $C_5$-$C_9$ hydrocarbons and preferably less than about 5 wt. % $C_{10}$ and heavier hydrocarbons.

With the distillate feedstream boiling below 249° C., the product stream comprises at least about 15 wt. % 1-ring aromatics.

EXAMPLES

The following examples illustrate the effectiveness of the inventive catalyst system in converting a distillate to gasoline-range hydrocarbons.

Pt/HY Zeolite Catalyst

Hydrogen exchanged Y zeolite (HY zeolite) was prepared by ion-exchange of 100 g of NaY zeolite ($SiO_2$/$Al_2O_3$ molar ratio of 30) through successive exchanges with aqueous solutions containing about 120.5 g ammonium chloride dissolved in one liter of deionized water. After each ion exchange step, the solid was filtered and washed with deionized water. Following the final exchange step the solid was washed until it was chloride free. The solid was dried in air at about 110° C. and calcined in the flow of air at about 500° C. for 2 hours.

The HY zeolite was then impregnated with platinum by incipient wetness impregnation using an aqueous $Pt(NH_3)_4(NO_3)_2$ solution. After impregnation, the solid was dried at about 110° C., calcined in oxygen at about 300° C. for 3 hours, and then reduced in-situ with hydrogen at about 400° C. for 2 hours to form the Pt/HY zeolite catalyst. The resulting Pt/HY zeolite catalysts contained from about 0.6 to about 1 wt. % platinum.

Pt/Sn/$SiO_2$ Catalyst

Silica was co-impregnated with platinum and tin by incipient wetness impregnation using an aqueous solution of hexachloroplatinic acid and tin chloride, in the presence of hydrogen chloride. After co-impregnation, the solid was dried at about 110° C., calcined in oxygen at about 300° C. for 3 hours, and then reduced in-situ with hydrogen at about 400° C. for 2 hours to form a Pt/Sn/$SiO_2$ catalyst. The resulting Pt/Sn/$SiO_2$ catalyst contained about 1 wt. % platinum and about 1 wt. % tin.

About 3 to 8 g quantities of each of the catalysts were used in the following runs.

Distillate samples A and B (and a 249° C. (−) fraction of Distillate Sample A) were contacted with the catalysts at the reaction conditions set out in Tables 1, 2 and 3, which also include the results of the runs.

TABLE 1

|  | Distillate Sample A (full range) | Pt/HY (1) | Pt/HY (1) + Pt/Sn/$SiO_2$ (3) | Pt/HY alone (2) | Pt/HY (2) + Pt/Sn/$SiO_2$ (3) |
|---|---|---|---|---|---|
| Paraffins (wt. %) | 26.9 | 36.1 | 37.6 | 34.1 | 45.3 |
| Cyclanes (wt. %) | 58.7 | 63.9 | 53.0 | 65.9 | 35.4 |
| 1-Ring Arom (wt. %) | 14.2 | 0.0 | 9.4 | 0.0 | 19.4 |
| 1-Ring Arom $C_6$-$C_9$ (wt. %) | 0.6 | 0.0 | 9.3 | 0.0 | 19.1 |
| 2-Ring Arom (wt. %) | 0.2 | 0.0 | 0.0 | 0.0 | 0.0 |
| 1-Np ring (**) (wt. %) | 28.2 | 61.7 | 50.9 | 60.5 | 35.1 |
| 2-Np ring + (**) (wt. %) | 30.6 | 2.1 | 2.0 | 5.4 | 0.3 |
| $C_1$-$C_4$ Light gases (wt. %) | — | NA | 8.3 | NA | 5.0 |
| $C_5$+ Liquid Products (wt. %) | — | NA | 91.7 | NA | 95.0 |
| 221° C.(−) *** (wt. %) | 41.0 | 99.6 | 99.6 | 99.5 | 99.6 |
| 95% Off (° F.) | 578.8 | 295.3 | 301.9 | 338.3 | 335.7 |
| RON | 26.6 | 75.8 | ~90 | 67.8 | 84.6 |
| MON | — | NA | NA | 67.2 | 81.2 |
| Specific Gravity @ 38.5° C. (gr/cc) | 0.8166 | 0.6791 | 0.6842 | 0.7086 | 0.6950 |

(**) 1-NP ring: 1-Ring Naphthenic compounds - Alkylcyclohexane type 2-NP ring: 2-Ring Naphthenic compounds - Alkyldecalin type
*** - wt. % of hydrocarbons boiling at or below 221° C. and typically considered gasoline range Catalysts:

| First Reactor | Second Reactor |
|---|---|
| 1 wt. % Pt/HY | 1 wt. % Pt and 1 wt. % Sn on $SiO_2$ |

Reaction Conditions (1) T = 255° C.; P = 300 psig; $H_2$/HC = 5000 SCFB WHSV = 3 $h^{-1}$
(2) T = 255° C.; P = 300 psig; $H_2$/HC = 5000 SCFB WHSV = 5 $h^{-1}$
(3) Sequential reactor; T = 450° C.; WHSV = 4 $h^{-1}$

TABLE 2

| | Distillate Sample A (249° C. (−) fraction) | Pt/Sn/SiO₂ (2) | Pt/HY (1) | Pt/HY (1) + Pt/ Sn/SiO₂ (2) | Pt/HY (3) | Pt/HY (3) + Pt/ Sn/SiO₂ (2) |
|---|---|---|---|---|---|---|
| Paraffins (wt. %) | 25.5 | 29.2 | 29.3 | 34.5 | 32.7 | 37.8 |
| Cyclanes (wt. %) | 59.9 | 37.1 | 70.7 | 42.0 | 67.1 | 42.1 |
| 1-Ring Arom (wt. %) | 13.9 | 27.9 | 0.0 | 20.8 | 0.2 | 19.4 |
| 1-Ring Arom $C_6$-$C_9$ (wt. %) | 0.6 | NA | 0.0 | 9.7 | 0.1 | 13.9 |
| 2-Ring Arom (wt. %) | 0.7 | 5.8 | 0.0 | 2.7 | 0.0 | 0.7 |
| 1-Np ring (**) (wt. %) | 29.5 | 17.5 | 49.9 | 29.8 | 54.0 | 34.0 |
| 2-Np ring + (**) (wt. %) | 30.4 | 19.6 | 20.8 | 12.2 | 13.1 | 8.1 |
| $C_1$-$C_4$ Light gases (wt. %) | — | NA | 9.2 | 8.3 | 2.8 | 3.1 |
| $C_5$+ Liquid Products (wt. %) | — | NA | 90.8 | 91.7 | 97.2 | 96.9 |
| 221° C.(−) *** (wt. %) | 70.1 | 59.3 | 92.8 | 87.4 | 96.8 | 96.8 |
| 95% Off (° F.) | 481.9 | NA | 409.5 | 456.1 | 409.1 | 415.1 |
| MON | 36.9 | 50.1 | 46.9 | NA | 54.5 | NA |
| RON | 30.4 | 46.9 | 43.2 | 63.5 | 56.1 | 73.7 |
| Specific Gravity @ 38.5° C. (gr/cc) | 0.8043 | NA | 0.7267 | 0.7314 | 0.7384 | 0.7696 |
| RVP (psi) | 0.8 | NA | 5.7 | 5.2 | NA | 8.8 |

(**) 1-NP ring: 1-Ring Naphthenic compounds - Alkylcyclohexane type 2-NP ring: 2-Ring Naphthenic compounds - Alkyldecalin type
*** - wt. % of hydrocarbons boiling at or below 221° C. and typically considered gasoline range Catalysts

| First Reactor | Second Reactor |
|---|---|
| 1 wt. % Pt/HY | 1 wt. % Pt and 1 wt. % Sn on SiO₂ |

Reaction Conditions (1) T = 245° C.; P = 300 psig; H₂/HC = 5000 SCFB, WHSV = 9 h⁻¹
(2) T = 430° C.; P = 300 psig; H₂/HC = 5000 SCFB, WHSV = 4 h⁻¹
(3) T = 245° C.; P = 300 psig; H₂/HC = 5000 SCFB, WHSV = 5 h⁻¹

TABLE 3

| | Distillate Sample B (full range) | Pt/HY (1) TOS⁻ = 9 hrs. | Pt/HY (1) + Pt/ Sn/SiO₂ (2) TOS = 9 hrs. | Pt/HY TOS > 650 hrs (1) | Pt/HY (1) + Pt/ Sn/SiO₂ (2) TOS > 650 hrs (1) |
|---|---|---|---|---|---|
| Paraffins (wt. %) | 26.5 | 30.6 | 33.1 | 31.4 | 30.5 |
| Cyclanes (wt. %) | 60.3 | 69.4 | 48.0 | 68.6 | 62.8 |
| 1-Ring Arom (wt. %) | 12.9 | 0.0 | 18.8 | 0.0 | 6.5 |
| 1-Ring Arom $C_6$-$C_9$ (wt. %) | 4.4 | 0.0 | 9.3 | 0.0 | 19.1 |
| 2-Ring Arom (wt. %) | 0.3 | 0.0 | 0.1 | 0.0 | 0.2 |
| 1-Np ring (**) (wt. %) | 33.4 | 64.3 | 42.3 | 60.6 | 54.3 |
| 2-Np ring + (**) (wt. %) | 26.9 | 5.1 | 5.6 | 8.0 | 8.5 |
| $C_1$-$C_4$ Light gases (wt. %) | — | NA | 16.2 | NA | 14.8 |
| $C_5$+ Liquid Products (wt. %) | — | NA | 83.8 | NA | 85.2 |
| 95% Off (° F.) | 485.8 | 332.3 | 359.3 | 368.3 | 375.0 |
| RON | 42.2 | NA | 79.2 | NA | 68.8 |
| MON | 43.1 | NA | 75.7 | NA | 67.2 |

TABLE 3-continued

| | | | | | |
|---|---|---|---|---|---|
| Specific Gravity @ 38.5° C. (gr/cc) | 0.8105 | NA | 0.7471 | NA | 0.7454 |

(**) 1-NP ring: 1-Ring Naphthenic compounds - Alkylcyclohexane type 2-NP ring: 2-Ring Naphthenic compounds - Alkyldecalin type
*** - wt. % of hydrocarbons boiling at or below 221° C. and typically considered gasoline range
"TOS = Time on Stream Catalysts:

| First Reactor | Second Reactor |
|---|---|
| 0.6 wt. % Pt/HY | 1 wt. % Pt and 1 wt. % Sn on SiO$_2$ |

Reaction Conditions (1) T = 255° C.; P = 200 psig; H$_2$/HC = 5000 SCFB WHSV = 3 h$^{-1}$
(2) T = 450° C.; P = 200 psig; H$_2$/HC = 5000 SCFB WHSV = 2.9 h$^{-1}$ As can be seen from the Tables, the inventive catalyst system is very effective in converting a distillate to gasoline-range hydrocarbons, evidenced by the decrease in specific gravity (evidencing a volume gain) ranging from about 4.5% to about 19%, the RON gains ranging from about 26 to about 63 RON numbers, and the near complete conversion of the distillate to 221° C.(−) hydrocarbons. This is true even for the run in Table 3 which ran for 650 hours time on stream.

Whereas this invention has been described in terms of the preferred embodiments, reasonable variations and modifications are possible by those skilled in the art. Such modifications are within the scope of the described invention and appended claims.

That which is claimed is:

1. A process comprising:
   i) contacting a distillate feedstream having an RON of less than about 45 and comprising a) $C_{10}$ and heavier hydrocarbons; b) at least about 20 wt. % 2-ring naphthenes; c) less than about 40 wt. % 1-ring naphthenes, and d) less than about 5 wt. % $C_6$-$C_9$ aromatics, wherein less than about 75 wt. % of said distillate feedstream boils at a temperature less than or equal to about 221° C.; with a first catalyst comprising a Group VIII metal and a zeolite to thereby produce an intermediate product comprising a) at least about 50 wt. % 1-ring naphthenes; and b) less than about 1 wt. % 1-ring aromatics; wherein at least about 90 wt. % of said intermediate product boils at a temperature less than or equal to about 221° C.; and
   ii) contacting said intermediate product with a second catalyst comprising a Group VIII metal, tin and an inorganic metal oxide support to thereby produce a product stream having an RON of at least about 60 and comprising a) less than about 15 wt. % 2-ring naphthenes; and b) at least about 9 wt. % $C_6$-$C_9$ aromatics; wherein at least about 90 wt. % of said product stream boils at a temperature less than or equal to about 221° C.

wherein the contacting of step (i) is at a temperature from about 232° C. to about 260° C., a pressure from about 250 psig to about 350 psig, and a WHSV from about 2 to about 9 hr$^{-1}$; and wherein the contacting of step (ii) is at a temperature from about 399° C. to about 452° C., a pressure from about 250 psig to about 350 psig, and a WHSV from about 2 to about 6 hr$^{-1}$.

2. A process in accordance with claim 1 wherein said distillate feedstream comprises at least about 25 wt. % 2-ring naphthenes and less than about 35 wt. % 1-ring naphthenes; and wherein said intermediate product comprises at least about 55 wt. % 1-ring naphthenes and less than about 0.5 wt. % 1-ring aromatics, and wherein at least about 95 wt. % of said intermediate product boils at a temperature less than or equal to about 221° C.; and wherein at least about 95 wt. % of said product stream boils at a temperature less than or equal to about 221° C.

3. A process in accordance with claim 1 wherein said Group VIII metal of said first catalyst comprises platinum.

4. A process in accordance with claim 1 wherein said Group VIII metal of said second catalyst comprises platinum.

5. A process in accordance with claim 1 wherein said inorganic metal oxide support is silica.

6. A process in accordance with claim 1 wherein said distillate feedstream boils below about 288° C.

7. A process in accordance with claim 1 wherein said first catalyst contains from about 0.1 to about 5 weight percent Group VIII metal, and wherein said second catalyst contains from about 0.5 to about 5 weight percent Group VIII metal and from about 0.5 to about 5 weight percent tin.

8. A process in accordance with claim 1 wherein said product stream comprises at least 80 wt. % $C_5$-$C_9$ hydrocarbons and less than 5 wt. % $C_{10}$ and heavier hydrocarbons.

9. A process in accordance with claim 1 wherein said product stream comprises at least 90 wt. % $C_5$-$C_9$ hydrocarbons and less than 5 wt. % C10 and heavier hydrocarbons.

10. A process in accordance with claim 1 wherein the contacting of step (i) is at a temperature from about 238° C. to about 257° C., a pressure from about 275 psig to about 325 psig, and a WHSV from about 3 to about 5 hr$^{-1}$; and wherein the contacting of step (ii) is at a temperature from about 413° C. to about 452° C., a pressure from about 275 psig to about 325 psig, and a WHSV from about 3 to about 5 hr$^{-1}$.

11. A process in accordance with claim 1 wherein said distillate feedstream boils below about 249° C.

12. A process in accordance with claim 11 wherein said Group VIII metal of said first catalyst comprises platinum, and wherein said Group VIII metal of said second catalyst comprises platinum.

13. A process in accordance with claim 11 wherein said first catalyst contains from about 0.1 to about 5 weight percent Group VIII metal, and wherein said second catalyst contains from about 0.5 to about 5 weight percent Group VIII metal and from about 0.5 to about 5 weight percent tin.

14. A process in accordance with claim 11 wherein said inorganic metal oxide support is silica.

15. A process in accordance with claim 11 wherein said product stream comprises at least about 15 wt. % 1-ring aromatics.

16. A process in accordance with claim 11 wherein said product stream comprises at least 80 wt. % $C_5$-$C_9$ hydrocarbons and less than 5 wt. % $C_{10}$ and heavier hydrocarbons.

17. A process in accordance with claim 11 wherein said product stream comprises at least 90 wt. % $C_5$-$C_9$ hydrocarbons and less than 5 wt. % $C_{10}$ and heavier hydrocarbons.

18. A process in accordance with claim 11 wherein the contacting of step (i) is at a temperature from about 238° C. to about 257° C., a pressure from about 275 psig to about 325 psig, and a WHSV from about 3 to about 5 $hr^{-1}$; and wherein the contacting of step (ii) is at a temperature from about 413° C. to about 452° C., a pressure from about 275 psig to about 325 psig, and a WHSV from about 3 to about 5 $hr^{-1}$.

\* \* \* \* \*